(12) United States Patent
Tsukamoto et al.

(10) Patent No.: US 7,330,104 B2
(45) Date of Patent: Feb. 12, 2008

(54) TIRE INFLATION PRESSURE MONITORING DEVICE

(75) Inventors: Taro Tsukamoto, Oobu (JP); Noritaka Matsuura, Aichi (JP); Akira Kadota, Okazaki (JP); Toshihiko Yamazaki, Okazaki (JP); Moriyasu Matsuno, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 252 days.

(21) Appl. No.: 11/148,357

(22) Filed: Jun. 9, 2005

(65) Prior Publication Data

US 2005/0275517 A1 Dec. 15, 2005

(30) Foreign Application Priority Data

Jun. 10, 2004 (JP) .............................. 2004-173027
Jun. 21, 2004 (JP) .............................. 2004-182815

(51) Int. Cl.
*B60C 23/00* (2006.01)
(52) U.S. Cl. ....................... 340/442; 340/447; 73/146.5
(58) Field of Classification Search ................. 340/442
See application file for complete search history.

(56) References Cited

U.S. PATENT DOCUMENTS 6,897,769 B2 * 5/2005 Hayashi et al. ............. 340/442
6,927,679 B2 * 8/2005 Taguchi et al. ............. 340/442
6,954,687 B2 * 10/2005 Taguchi et al. ............. 701/29
2002/0070876 A1 * 6/2002 Hirohama et al. ..... 340/870.07
2003/0156025 A1 * 8/2003 Okubo ........................ 340/447

FOREIGN PATENT DOCUMENTS

JP 3061047 B1 4/2000
JP 2002-131165 A 5/2002

* cited by examiner

Primary Examiner—Donnie L. Crosland
(74) Attorney, Agent, or Firm—Birch, Stewart, Kolasch & Birch, LLP

(57) ABSTRACT

A tire inflation pressure monitoring device includes transmitters for transmitting air pressure signals indicative of air pressures in tires, detected by respective air pressure sensors, and a receiver for generating a warning signal in accordance with the air pressure signals received from the transmitters. The air pressure signal transmitted from each of the transmitters includes an ID of the corresponding transmitter as an ID signal. When the receiver is in an ID registration mode in which the IDs of the transmitters are registered (S12), the transmitters are forced to transmit the air pressure signals, and if the number of the received air pressure signals is equal to a predetermined value, the receiver registers the IDs of the transmitters based on the ID signals included in the received air pressure signals (S20, S26).

8 Claims, 4 Drawing Sheets

TIRE INFLATION PRESSURE MONITORING DEVICE

BACKGROUND OF THE INVENTION

1. Field of the Invention

The present invention relates to tire inflation pressure monitoring devices, and more particularly, to techniques for registering IDs of transmitters which transmit air pressure signals indicative of tire inflation pressures, detected by respective air pressure sensors, to a receiver.

2. Description of the Related Art

In recent years, various devices have been developed and put to practical use which are configured such that a plurality of items of air pressure information, obtained by tire pressure sensors arranged in respective tires of a motor vehicle, are transmitted as air pressure signals by radio from transmitters attached to the respective tires and are received by a receiver arranged in the vehicle. In this type of device, if any of the air pressure signals received by the receiver shows a value smaller than a predetermined value, a warning lamp arranged near the driver's seat (e.g., on the instrument panel) of the vehicle, for example, is switched on. Thus, the driver is warned that the tire inflation pressure needs to be increased.

The air pressure signal transmitted in such devices includes ID information of the individual transmitters (or tire pressure sensors), in addition to the air pressure information. The ID information of the transmitters is previously registered in the receiver at the time of shipment or replacement of tires. It is therefore possible to identify the tire whose air pressure has decreased.

Methods of registering the transmitters' IDs in the receiver include, for example, a method in which ID signals are forcedly transmitted from the tire pressure sensors by using a registration tool, and a method in which ID signals are transmitted, together with the air pressure signals, from the tire pressure sensors at periodic intervals during traveling.

The method of transmitting the ID signals from the transmitters and receiving the signals by the receiver is, however, associated with the problem described below. If, during ID registration, an ID signal is received together with an air pressure signal from a vehicle near the vehicle in question, for example, there is a possibility that the ID signal from the nearby vehicle is erroneously registered as a correct ID signal. Especially, in places where numerous vehicles exist, such as a vehicle shipment area or a vehicle maintenance area, it is likely that a vehicle is input with ID signals of other vehicles. This problem is often encountered when transmitters' IDs are registered in such places.

To solve the problem, there has been proposed a device in which, with respect to the transmitters associated with n tires of a vehicle, transmission order of ID signals is previously set as an ID sequence, and if the order of reception of the ID signals disagrees with the preset ID sequence, ID registration is not performed (cf. Unexamined Japanese Patent Publication No. 2002-131165).

There has also been proposed a device in which the transmitters associated with respective tires of a vehicle repeatedly transmit their ID signals at predetermined intervals of time, and if it is judged after a lapse of a predetermined time that the received ID signals show IDs greater than the number n of tires to be registered, the most frequently received n IDs are registered as proper tire ID (cf. Japanese Patent No. 3061047).

Further, a method has been proposed in which the tire inflation pressure is suddenly changed for a while to cause the tire pressure sensor to transmit the ID signal along with the air pressure signal.

However, the device disclosed in Unexamined Japanese Patent Publication No. 2002-131165 has the problem that the IDs fail to be registered if the order of reception of ID signals changes for some reason or other, though the number of ID signals is the same.

In the device disclosed in Japanese Patent No. 3061047, on the other hand, if a vehicle near the vehicle in question transmits ID signals with high frequency, the IDs from the nearby vehicle may possibly be registered in error. In such cases, it is necessary that the same ID signals be repeatedly received a number of times up to a certain frequency, which, however, requires considerable time for the ID registration.

Further, with the method in which the tire inflation pressure is suddenly changed for a while to cause the tire pressure sensor to transmit the ID signal along with the air pressure signal, there is a possibility that an ID signal received from a different vehicle running near the vehicle in question is registered in error.

SUMMARY OF THE INVENTION

The present invention was created to solve the above problems, and an object thereof is to provide a tire inflation pressure monitoring device which includes transmitters for transmitting air pressure signals indicative of tire inflation pressures, detected by respective air pressure sensors, to a receiver and which permits accurate and easy registration of IDs of the transmitters in the receiver.

To achieve the object, a tire inflation pressure monitoring device of the present invention comprises: transmitters attached to respective tires of a motor vehicle, for transmitting air pressure signals indicative of air pressures in the tires detected by respective air pressure sensors; and a receiver for receiving the air pressure signals from the respective transmitters, the receiver being adapted to generate a warning signal in accordance with the received air pressure signals. The air pressure signal transmitted from each of the transmitters includes an ID of the corresponding transmitter as an ID signal. The receiver is capable of switching a mode thereof to an ID registration mode in which the IDs of the transmitters are registered. During the ID registration mode, the transmitters are forced to transmit the air pressure signals, and if the number of the air pressure signals received from the transmitters is equal to a predetermined value, the receiver registers the IDs of the transmitters based on the ID signals included in the received air pressure signals.

The present invention also provides a tire inflation pressure monitoring device which comprises: transmitters attached to respective tires of a motor vehicle, for transmitting air pressure signals indicative of air pressures in the tires detected by respective air pressure sensors; and a receiver for receiving the air pressure signals from the respective transmitters, the receiver being adapted to generate a warning signal if the air pressure in any of the tires, indicated by the received air pressure signals, is equal to or lower than a predetermined value. The air pressure signal transmitted from each of the transmitters includes an ID of the corresponding transmitter as an ID signal. The receiver is capable of switching a mode thereof to an ID registration mode in which the IDs of the transmitters are registered. If, during the ID registration mode, the air pressures in the tires, indicated by the respective air pressure signals, become equal to or lower than the predetermined value, the receiver registers the IDs of the transmitters based on the respective ID signals included in the air pressure signals.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

Embodiments of the present invention will be hereinafter described with reference to the accompanying drawings.

Figure 1:
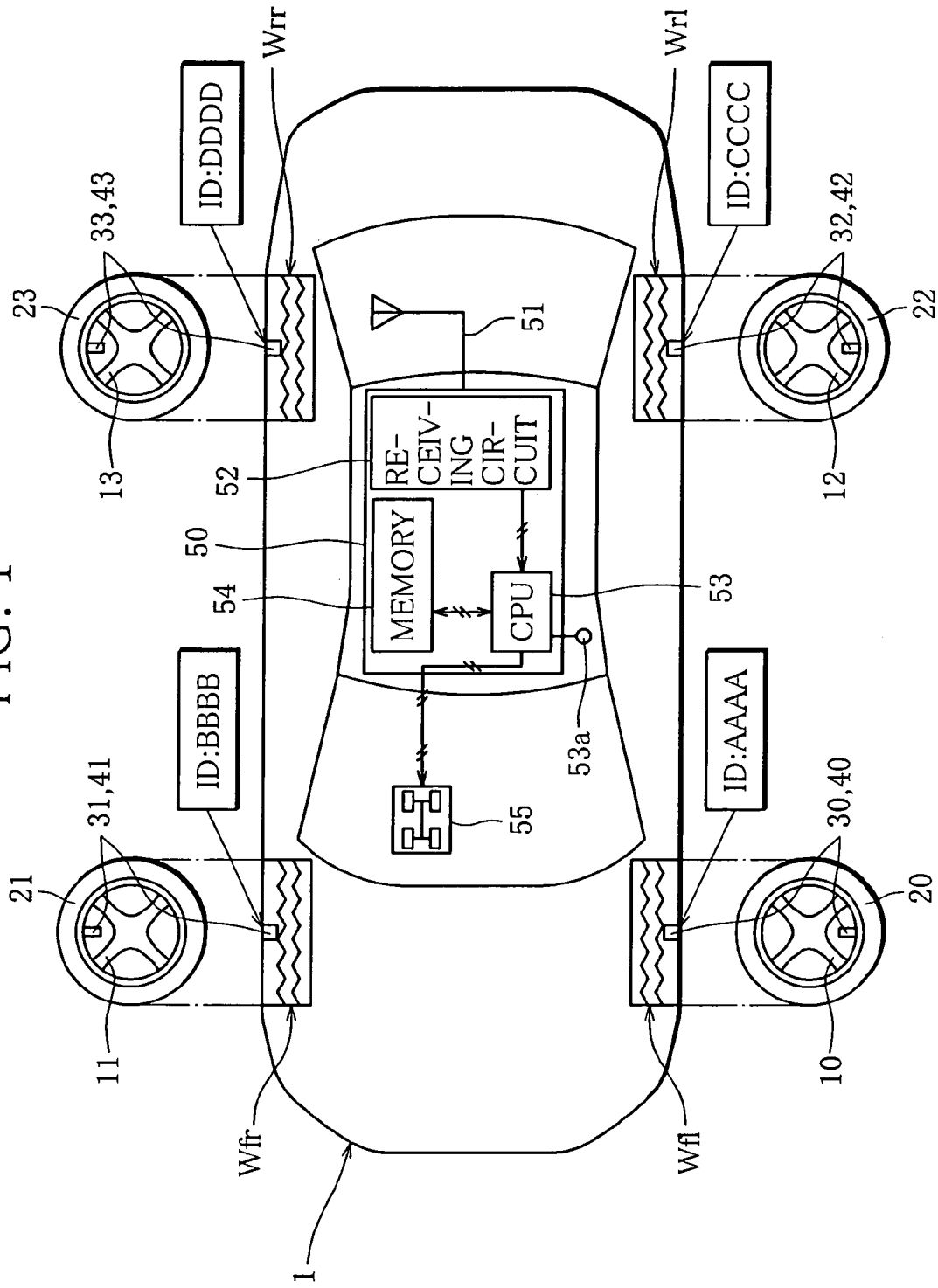
FIG. 1 schematically shows the configuration of a tire inflation pressure monitoring device of the present invention mounted on a motor vehicle.

Referring to FIG. 1, there is schematically shown the configuration of a tire inflation pressure monitoring device of the present invention mounted on a motor vehicle 1. In the following, the configuration of the tire inflation pressure monitoring device will be explained.

As shown in the figure, the vehicle 1 has four wheels, that is, a left front wheel Wfl, a right front wheel Wfr, a left rear wheel Wrl and a right rear wheel Wrr, for example. The wheels Wfl, Wfr, Wrl and Wrr respectively comprise steel or aluminum wheels 10, 11, 12 and 13, and rubber tires 20, 21, 22 and 23 fitted round the rims of the respective wheels.

The tires 20 to 23 are each a tubeless tire, for example, and the rims of the wheels 10 to 13 are provided with inflation valves 30 to 33 for letting air into the respective tires.

Transmitters 40 to 43, each with an air pressure sensor, are attached to the inflation valves 30 to 33, respectively. Each of the transmitters 40 to 43 is capable of detecting the air pressure in the corresponding tire by means of the air pressure sensor and transmitting an air pressure signal including information on the detected air pressure by radio.

A receiver 50 for receiving the air pressure signals from the transmitters 40 to 43 is arranged in the vehicle compartment of the vehicle 1 and forms part of an electronic control unit (ECU), for example, which performs various control operations for the vehicle 1.

The receiver 50 includes a receiving circuit 52 for performing detection etc. of radio waves received by an antenna 51, a CPU 53 for performing computations based on the signals from the receiving circuit 52, and a memory 54 for storing data obtained as a result of the processing by the CPU 53. The CPU 53 is connected with a warning lamp 55 through an output interface. The warning lamp 55 is arranged a driver's seat of the vehicle 1, for example, an instrument panel. Further, the CPU 53 is connected with a connector 53a for an external input/output device (Multi-Use Tester; hereinafter referred to as MUT), not shown. Although not shown, the MUT has input buttons (input keys) and a display for displaying the MUT's instructions for the CPU 53 as well as the status of the CPU 53. The ECU can be adjusted in various ways through the MUT.

The tire inflation pressure monitoring device operates in the manner described below. When air pressure signals indicative of lowering of the air pressures in the respective tires 20 to 23, for example, are transmitted from the transmitters 40 to 43 by radio, the signals are received by the receiving circuit 52 of the receiver 50 and processed by the CPU 53. If any of the air pressures is equal to or lower than an air pressure warning threshold, a warning signal is output to the warning lamp 55.

Specifically, the air pressure signals transmitted from the transmitters 40 to 43 each include an ID signal indicative of an ID (identity) assigned to the corresponding transmitter, besides information about the detected air pressure. The receiver 50 can determine, by the ID signal, from which of the transmitters 40 to 43 the signal has been received. Namely, the ID signal enables the receiver 50 to accurately determine which of the tires 20 to 23 the air pressure information in the air pressure signal is associated with. For example, as shown in FIG. 1, the ID "AAAA" is assigned to the transmitter 40, the ID "BBBB" to the transmitter 41, the ID "CCCC" to the transmitter 42, and the ID "DDDD" to the transmitter 43.

Thus, if the air pressure in any of the tires 20 to 23 becomes low, an air pressure signal indicative of the low air pressure is transmitted together with an ID signal, whereupon the receiver 50 identifies the low-pressure tire by comparing the ID signal with the IDs registered therein and generates a warning signal. In response to the warning signal, the warning lamp 55 is turned on or blinked to give a warning of low air pressure. The warning lamp 55 is constructed, for example, such that the tires 20 to 23 are separately shown in accordance with the warning signal, and thus the driver can easily identify the tire with respect to which the warning is being given.

To enable the receiver 50 to determine from which of the transmitters 40 to 43 the air pressure signal has been received, it is necessary that the IDs assigned to the respective transmitters be registered beforehand in the memory 54 of the receiver 50 at the time of shipment of the vehicle 1, replacement of tires, etc. To this end, the receiver 50 has two operation modes to be switched from one to the other, that is, a normal mode for warning of low air pressure and an ID registration mode for registering IDs.

In the case of registering IDs, generally, the receiver 50 is set in the ID registration mode and the individual transmitters are caused to transmit their ID signals by radio so that the IDs can be registered.

If, however, the ID registration is performed in places where there are many other vehicles around the vehicle 1, such as a vehicle shipment area or a vehicle maintenance area, ID signals from the transmitters of other vehicles are liable to be input to the receiver of the vehicle 1 and transmitter IDs of other vehicles, instead of those of the vehicle 1, may possibly be registered in error, as mentioned above.

When performing the ID registration at the time of shipment of the vehicle 1 or replacement of tires, moreover, it is desirable that the ID registration be completed as quickly as possible.

The above problem is solved by the present invention, and the following describes how the ID registration is performed using the tire inflation pressure monitoring device of the present invention.

First Embodiment

A first embodiment of the present invention will be explained first.

According to the first embodiment, the ID registration is carried out with a MUT (Multi-Use Tester) connected to the connector 53a so as to switch the mode of the receiver from the normal mode to the ID registration mode by the MUT, and also the transmitters 40 to 43 are caused to transmit their respective air pressure signals by forced transmission means. To permit the mode switching from the normal mode to the ID registration mode, the receiver 50 may be provided with a mode switch and the mode switch may be operated to switch the mode to the ID registration mode.

The forced transmission means may be implemented, for example, by sending a forced transmission command from the MUT to each of the transmitters 40 to 43 through the receiver 50. Alternatively, a special forced transmission unit may be used to send the forced transmission command to each of the transmitters 40 to 43.

Figure 2:
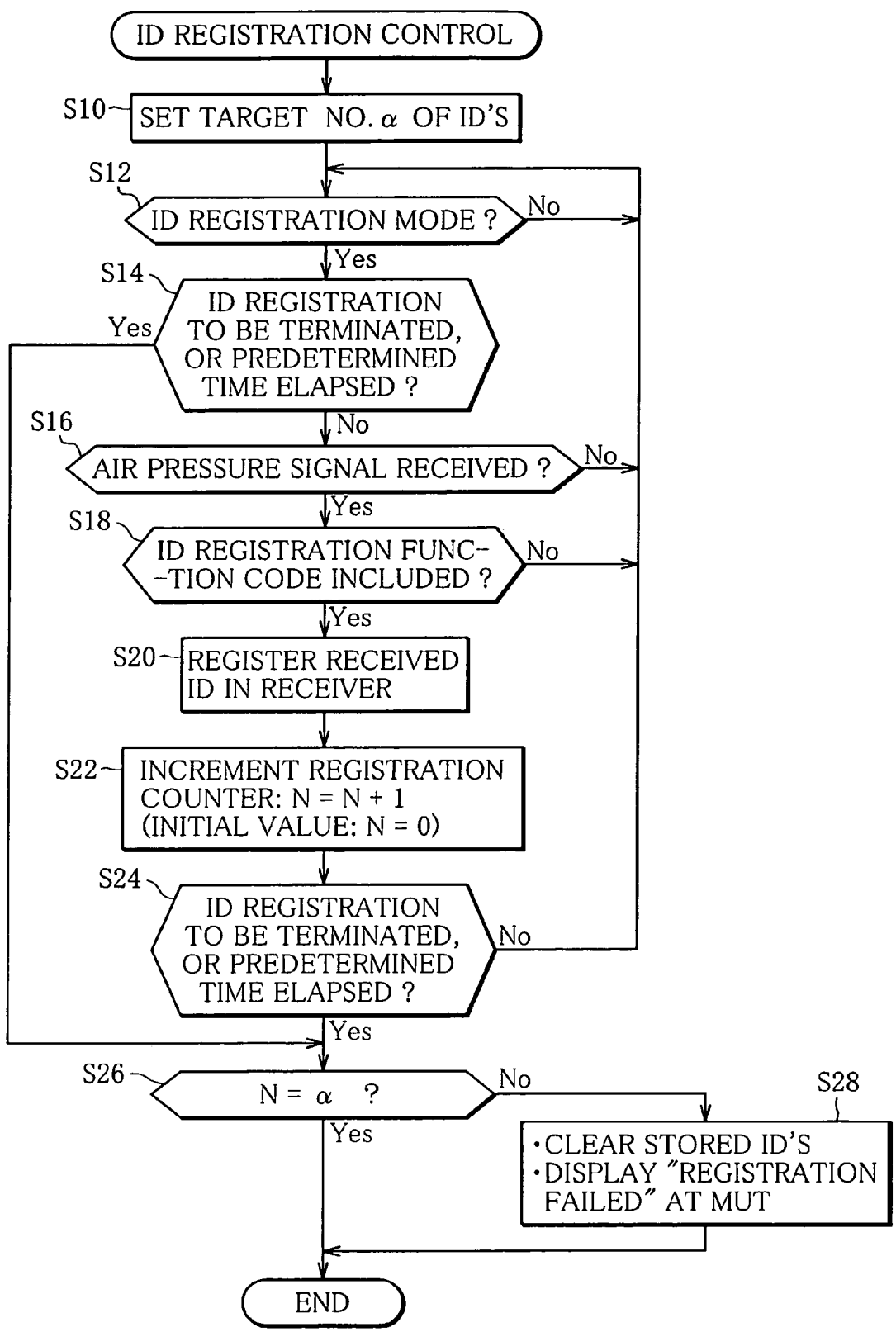
FIG. 2 is a flowchart showing an ID registration control routine executed by a receiver according to a first embodiment of the present invention.

Referring now to FIG. 2, there is shown an ID registration control routine executed by the receiver 50. In the following, the control routine will be explained with reference to the flowchart.

In Step S10, the connected MUT is operated to set a target number α of IDs in the CPU 53. In this instance, the target number α of IDs corresponds to the number of the wheels Wfl, Wfr, Wrl and Wrr to be registered, namely, "4".

Then, in Step S12, it is determined whether or not the receiver 50 is in the ID registration mode. To determine whether the receiver is in the ID registration mode or not, the output of the MUT is checked to see if "ID REGISTRATION MODE" is displayed on the MUT after the mode is switched from the normal mode to the ID registration mode by the MUT, for example. If the decision in this step is negative (No), Step S12 is executed again. On the other hand, if the decision is affirmative (Yes) and thus it is judged that the receiver is in the ID registration mode, the routine proceeds to Step S14.

In Step S14, it is determined whether or not either of the following conditions is fulfilled: the condition that the MUT has been operated to terminate the ID registration, and the condition that a predetermined time has elapsed after the switching to the ID registration mode, as described in detail later. The decision in this step is No immediately after the switching to the ID registration mode; therefore, the routine proceeds to Step S16.

It is determined in Step S16 whether or not the receiver 50 has received an air pressure signal from any of the transmitters 40 to 43 as a result of generation of the transmission command by the forced transmission means. If the decision is No and thus no air pressure signal has been received, the routine returns to Step S12. On the other hand, if the decision is Yes and an air pressure signal has been received from any one of the transmitters 40 to 43, the routine proceeds to Step S18.

In Step S18, it is determined whether or not the received air pressure signal includes a function code permitting ID registration. Specifically, the transmitters 40 to 43 are configured in such a manner that when forced to transmit an air pressure signal by the forced transmission means, each transmitter transmits an air pressure signal including an ID registration function code, which is different from a normal function code. In this step, the receiver 50 determines whether or not the received air pressure signal includes the ID registration function code. If the decision is No and thus the function code is a normal function code and not the ID registration function code, the routine returns to Step S12. On the other hand, if the decision is Yes and the function code is the ID registration function code, the routine proceeds to Step S20.

In Step S20, the receiver 50 registers, in the memory 54, the ID indicated by the ID signal included in the received air pressure signal. Subsequently, in Step S22, the count N of a registration counter provided in the CPU 53 is incremented by the number of received air pressure signals, that is, ID signals (e.g., N=N+1). The count N of the registration counter is reset to an initial value of "0" at the time of switching to the ID registration mode (initial value: N=0).

In Step S24 identical to Step S14, it is determined whether or not either of the following conditions is fulfilled: the condition that the MUT has been operated to terminate the ID registration, and the condition that the predetermined time has elapsed after the switching to the ID registration mode.

During the ID registration, the forced transmission means causes the individual transmitters 40 to 43 to transmit their air pressure signals, and when the forced transmission of the air pressure signals from all of the transmitters 40 to 43 is completed, the MUT is operated to terminate the ID registration. Even if an air pressure signal is received thereafter, the ID included therein is not stored in the memory 54 and the registration counter is not incremented. Accordingly, in Step S24, a determination is made as to whether or not the operation for terminating the ID registration has been performed.

In Step S24, it is also determined whether or not the predetermined time has elapsed after the switching to the ID registration mode, and the predetermined time is previously set to a time period (e.g., 5 min) which is normally required for the ID registration.

If No in Step S24, the routine returns to Step S12. On the other hand, if Yes in Step S24 and thus it is judged that the operation for terminating the ID registration has been performed or that the predetermined time has elapsed, the ID registration is terminated, thereby keeping the memory 54 from storing the IDs of subsequently received air pressure signals and preventing the registration counter from being incremented, and the routine proceeds to Step S26. The routine proceeds to Step S26 also when the decision in Step S14 is Yes.

In Step S26, it is determined whether or not the count N of the registration counter is equal to the target number a of IDs (N=α). Namely, the number of IDs registered based on the ID signals transmitted from the transmitters 40 to 43 should equal the number of transmitters, that is, "4", and thus should coincide with the target number α of IDs. In this step, therefore, it is determined whether or not the receiver 50 has registered the IDs of all transmitters 40 to 43 in the memory 54.

If the decision in Step S26 is Yes and thus the count N is equal to the target number α of IDs (N=α), then it can be concluded that the IDs of all transmitters 40 to 43 have been properly registered in the memory 54, and accordingly, the routine is ended.

On the other hand, if the decision in Step S26 is No and thus the count N is not equal to the target number α of IDs (N≠α), for example, if the count N is greater than the target number α (N>α), it can be concluded that an ID signal(s) has been input from a transmitter(s) of a vehicle different from the vehicle 1 and that the transmitter ID(s) of the different vehicle has been registered in error. In this case, the routine proceeds to Step S28. If, on the other hand, the count N is smaller than the target number α of IDs (N<α), it can be concluded that one or more IDs of the transmitters 40 to 43 failed to be normally registered because of disturbance, and also in this case, the routine proceeds to Step S28.

In Step S28, the IDs already registered in the memory 54 are cleared and "REGISTRATION FAILED", for example, is displayed on the display of the MUT, followed by termination of the routine. Subsequently, the routine is again executed. Namely, when it is judged that one or more IDs have been erroneously registered in the receiver 50, the registration is regarded as having failed and the stored IDs are not registered in the end.

Thus, in the ID registration control of the tire inflation pressure monitoring device according to the first embodiment of the present invention, if the count N of the ID registration counter is different from the preset target number α of IDs, the stored IDs are finally discarded and are not registered in the receiver 50.

With the tire inflation pressure monitoring device of the first embodiment, therefore, erroneous registration can be eliminated and the IDs assigned to the respective transmitters 40 to 43 can be accurately registered in the receiver 50. Further, since the count N of the ID registration counter has only to be compared with the preset target number α of IDs to determine whether or not the former equals the latter, reliable ID registration can be easily performed with simple configuration.

In this embodiment, if the MUT is operated to terminate the ID registration or the predetermined time has elapsed after the switching to the ID registration mode, the ID registration is terminated. Accordingly, even if air pressure signals are received thereafter, the IDs included therein are not stored in the memory 54 and the registration counter is not incremented.

This serves to minimize the chance for the receiver 50 to register unnecessary ID signals other than those from the transmitters 40 to 43 of the vehicle 1, permitting the receiver 50 to accurately and quickly register the IDs of the transmitters 40 to 43 of the vehicle 1.

Moreover, in the first embodiment, only if the air pressure signal includes the ID registration function code, registration of the ID included therein is permitted.

Accordingly, if the function code included is the normal function code different from the ID registration function code, for example, if an ordinary air pressure signal transmitted from a nearby vehicle is input to the receiver 50, such an air pressure signal is rejected and the transmitter ID included therein is never registered, whereby the IDs of the transmitters 40 to 43 of the vehicle 1 can be registered in the receiver 50 with higher accuracy.

In the ID registration procedure of the first embodiment, the ID included in the received signal is once stored in the memory 54 in Step S20, then it is determined in Step S26 whether or not the count N of the ID registration counter is equal to the preset target number α of IDs, and the stored IDs are held if the two are equal to each other and are cleared in Step S28 if the two are not equal to each other. The order of execution of these steps may alternatively be changed such that the IDs are stored in the memory 54 only if the count N of the ID registration counter is equal to the preset target number α of IDs.

Second Embodiment

The following describes ID registration performed by a tire inflation pressure monitoring device according to a second embodiment of the present invention.

According to the second embodiment, the ID registration is carried out with the MUT connected to the connector 53a so as to switch the mode of the receiver from the normal mode to the ID registration mode by the MUT. Also, during the ID registration mode of the receiver 50, the air pressures in the tires 20 to 23 are substantially decreased in sequence or simultaneously, and only if the air pressure in each tire becomes equal to or lower than an air pressure registration threshold (predetermined value), registration of the corresponding ID is permitted. In order to permit the switching from the normal mode to the ID registration mode, the receiver 50 may be provided with a mode switch, as in the first embodiment, so that the mode can be switched to the ID registration mode by operating the mode switch.

Figure 3:
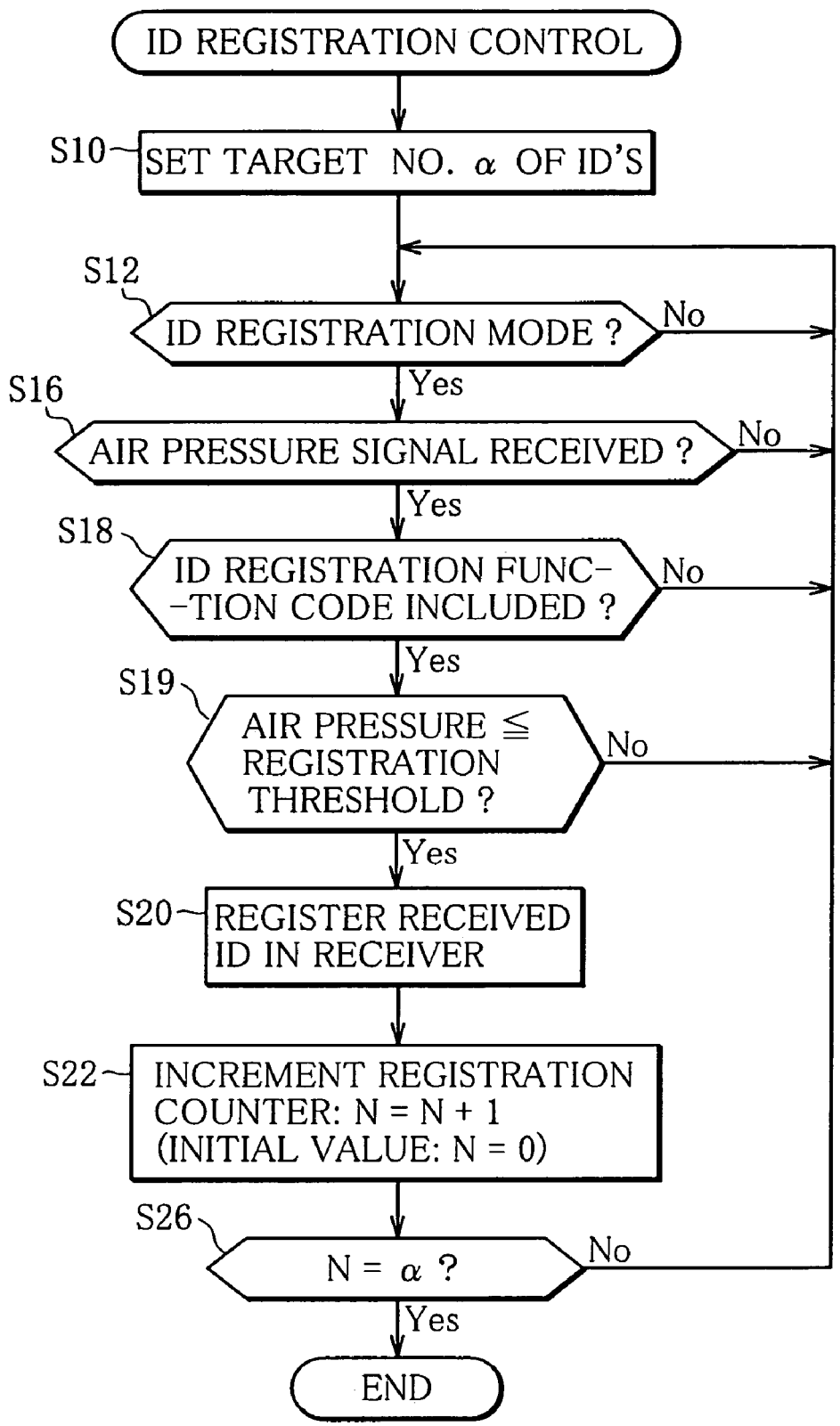
FIG. 3 is a flowchart showing an ID registration control routine executed by the receiver according to a second embodiment of the present invention.

FIG. 3 is a flowchart showing an ID registration control routine executed by the receiver 50, and the control routine will be explained below with reference to the flowchart. In the figure, identical step numbers are used to denote steps identical with those appearing in FIG. 2 illustrating the first embodiment. In the following, therefore, such identical steps will be only briefly explained and the differences between the first and second embodiments will be explained in detail.

In Step S10, the target number α of IDs is set in the CPU 53, as in the first embodiment described above.

Then, in Step S12, it is determined whether or not the receiver 50 is in the ID registration mode, as in the first embodiment. If the decision is No, Step S12 is executed again; if the decision is Yes and thus the receiver 50 is in the ID registration mode, the routine proceeds to Step S16.

The air pressures in the tires 20 to 23 are substantially decreased in sequence or simultaneously, and in Step S16, it is determined whether or not the receiver 50 has received an air pressure signal indicative of decreased pressure from any of the transmitters 40 to 43. If the decision is No and thus it is judged that no air pressure signal has been received, the routine returns to Step S12. On the other hand, if the decision is Yes, that is, if it is judged that an air pressure signal has been received from any of the transmitters 40 to 43, the routine proceeds to Step S18.

In Step S18, it is determined whether or not the received air pressure signal includes the ID registration function code, as in the first embodiment. If the decision is No and thus the included function code is a normal function code and not the ID registration function code, the routine returns to Step S12; if the decision is Yes and thus the included function code is the ID registration function code, the routine proceeds to Step S19.

It is determined in Step S19 whether or not the received air pressure signal shows an air pressure lower than or equal to the air pressure registration threshold (predetermined value) set beforehand. In this instance, the registration threshold is set so as to be equal to the aforementioned air pressure warning threshold (predetermined value), but the registration threshold may be smaller than the warning threshold (air pressure warning threshold≧air pressure registration threshold). If the decision in Step S19 is No and it is judged that the air pressure is higher than the registration threshold, the routine returns to Step S12. On the other hand, if the decision is Yes and it is judged that the air pressure is lower than or equal to the registration threshold, the routine proceeds to Step S20.

In Step S20, the receiver 50 stores and registers, in the memory 54, the ID in the ID signal included in the received air pressure signal, as in the first embodiment. Namely, the ID in the ID signal included in the received air pressure signal is registered in this step only when the receiver 50 is in the ID registration mode and at the same time the air pressure indicated by the received air pressure signal is lower than or equal to the registration threshold.

Subsequently, in Step S22, the count N of the registration counter provided in the CPU 53 is incremented by the number of received air pressure signals, that is, ID signals (e.g., N=N+1), as in the first embodiment.

Then, in Step S26, it is determined whether or not the incremented count N of the registration counter is equal to the target number α of IDs (N=α), as in the first embodiment. If the decision is Yes and thus the count N is equal to the target number α (N=α), the routine is ended, thereby terminating the ID registration. On the other hand, if the decision is No and the count N disagrees with the target number α (N≠α), the routine returns to Step S12.

As described above, in the ID registration control of the tire inflation pressure monitoring device according to the second embodiment of the present invention, the transmitter ID is registered only if the receiver 50 is in the ID registration mode and at the same time the air pressure indicated by the received air pressure signal is lower than or equal to the air pressure registration threshold.

With the tire inflation pressure monitoring device of the second embodiment, therefore, even in the case where an ID signal from a transmitter of a nearby vehicle is input to the receiver 50, the transmitter ID of the nearby vehicle can be effectively prevented from being registered as a transmitter ID of the vehicle 1, whereby the IDs assigned to the respective transmitters 40 to 43 can be registered in the receiver 50 with accuracy.

Also in the second embodiment, only when the air pressure signal includes the ID registration function code, registration of the ID included therein is permitted.

Accordingly, where the function code included is a normal function code, for example, where an ordinary air pressure signal transmitted from a nearby vehicle is input to the receiver 50, the ID signal included in such an ordinary air pressure signal is ignored and the transmitter ID included therein is prevented from being registered in error, whereby the IDs of the transmitters 40 to 43 of the vehicle 1 can be registered in the receiver 50 with higher accuracy.

The tire inflation pressure monitoring device of the second embodiment is configured such that even during the ID registration mode, the receiver 50 outputs a warning signal to the warning lamp 55, as in the normal mode, to give a warning of decreased air pressure. In the following, air pressure warning control will be described.

Figure 4:
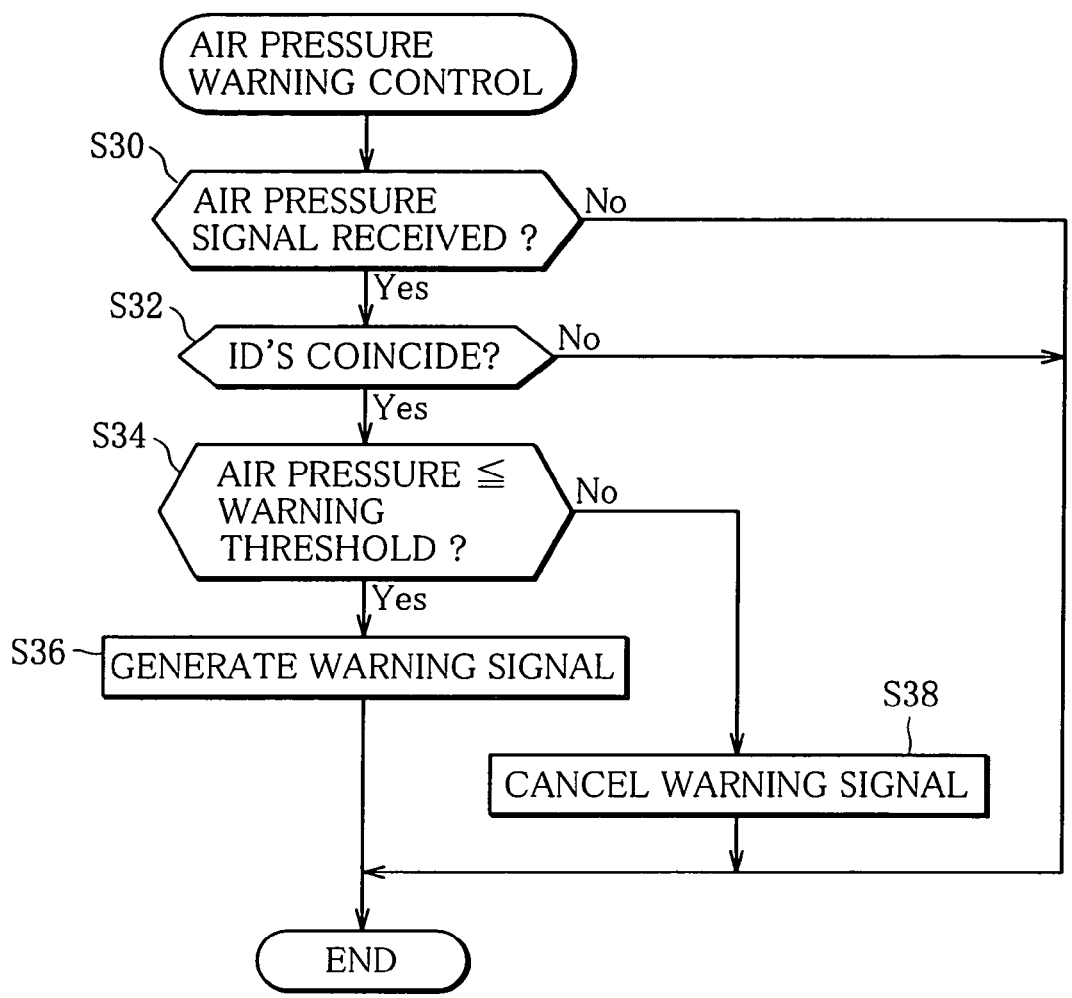
FIG. 4 is a flowchart showing an air pressure warning control routine executed by the receiver.

FIG. 4 is a flowchart showing an air pressure warning control routine, and the control routine will be explained with reference to the flowchart.

The air pressure in one of the tires 20 to 23 is decreased, and it is determined in Step S30 whether or not the receiver 50 has received an air pressure signal from any of the transmitters 40 to 43, as in the aforementioned Step S16. If the decision is No and thus it is judged that no air pressure signal has been received, the routine is ended. If, on the other hand, the decision is Yes and it is judged that an air pressure signal has been received from any of the transmitters 40 to 43, the routine proceeds to Step S32.

Where the air pressures in the tires 20 to 23 have been substantially decreased in sequence or simultaneously in the ID registration mode and thus it is judged in Step S16 of the ID registration control routine that an air pressure signal has been received, the decision in Step S30 is naturally Yes and the routine proceeds to Step S32.

In Step S32, it is determined whether or not the ID included in the received air pressure signal coincides with one registered in the receiver 50. If the decision is No and the IDs do not coincide, the routine is ended; if the decision is Yes, the routine proceeds to Step S34.

In the case where the ID has been registered in Step S20 of the ID registration control routine as stated above, the ID included in the air pressure signal should coincide with one registered in the receiver 50. In this case, the decision in Step S32 is naturally Yes and the routine proceeds to Step S34.

In Step S34, it is determined whether or not the received air pressure signal shows an air pressure lower than or equal to the preset air pressure warning threshold. If the decision is Yes, that is, if it is judged that the air pressure is lower than or equal to the warning threshold, the routine proceeds to Step S36, in which a warning signal is generated to turn on or blink the warning lamp 55. The air pressure warning threshold may have two different values, one used for initiating the warning and the other for canceling the warning so that a hysteresis may be provided between the initiation and cancellation of the warning.

As stated above, the air pressure warning threshold is equal to the registration threshold (predetermined value) or is larger than same. Accordingly, where the air pressure has been judged to be lower than or equal to the registration threshold in Step S19 of the ID registration control routine, the decision in Step S34 is naturally Yes and the routine proceeds to Step S36, in which the warning lamp 55 is turned on or blinked.

After the IDs are registered in the ID registration mode, the decreased air pressures in the tires 20 to 23 are restored to the original proper air pressure one after another or collectively at a time. In Step S32 executed following the air pressure restoration, the receiver 50 identifies the tire whose air pressure has been increased, and then in Step S34, it is again determined whether or not the air pressure has a value lower than or equal to the air pressure warning threshold. If the decision in Step S34 is No and thus it is judged that the air pressure in the tire has become higher than the warning threshold, the routine proceeds to Step S38, in which the warning signal for the corresponding tire or all of the tires is canceled, so that the lighting or blinking of the warning lamp 55 stops.

Thus, after the air pressures in all tires, of which the IDs have been registered, are restored to the original proper air pressure, the lighting or blinking of the warning lamp 55 should stop completely if the registered IDs are correct. If the lighting or blinking of the warning lamp 55 stops, therefore, it can be concluded that the IDs have been accurately registered.

On the other hand, if the warning signal is not canceled even though the air pressures in all tires, of which the IDs have been registered, are restored to the original proper air pressure, then it is probable that the ID of the tire with respect to which the warning signal remains on has been registered in error due to disturbance or the like, causing disagreement between the ID included in the transmitted ID signal and the ID stored in the receiver 50.

Thus, in the ID registration control of the tire inflation pressure monitoring device according to the second embodiment of the present invention, after the IDs are registered in the ID registration mode, the decreased air pressures of the tires are restored to the original proper air pressure, and this makes it possible to confirm with ease that the IDs of the transmitters 40 to 43 have been accurately registered. In the case of disagreement of IDs, the ID associated with the tire in question has only to be registered again.

While the tire inflation pressure monitoring devices according to the embodiments of the present invention have been described, it is to be noted that the present invention is not limited to the above embodiments.

For example, in the above embodiments, the tires 20 to 23 are tubeless tires and the transmitters 40 to 43 are attached to the inflation valves 30 to 33 which are provided at the rims of the wheels 10 to 13, respectively. Alternatively, the tires 20 to 23 may be tube-type tires, and in this case, the transmitters may be attached to respective valves of the tubes.

Also, in the above embodiments, the IDs of the four transmitters 40 to 43 associated with the wheels Wfl, Wfr, Wrl and Wrr, respectively, are registered. In cases where the vehicle 1 is equipped with a spare tire, an ID should preferably be assigned to a transmitter associated with the spare tire and be registered in the receiver. The target number α of IDs to be registered is, in this case, "5" or more depending on the number of spare tires.

Further, in the foregoing embodiments, the IDs of all transmitters 40 to 43 associated with the wheels Wfl, Wfr, Wrl and Wrr, respectively, are registered. Where one or more wheels or tubes, among the wheels Wfl, Wfr, Wrl and Wrr, have been replaced, for example, the IDs of only those unregistered transmitters of the replaced wheels or tubes may be registered according to the aforementioned ID registration control routine. In this case, the target number α of IDs to be registered is equal to the number of replaced transmitters of which the IDs are not registered yet.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tire inflation pressure monitoring device, comprising:
transmitters attached to respective tires of a vehicle, for transmitting air pressure signals indicative of air pressures in the tires detected by respective air pressure sensors; and
a receiver for receiving the air pressure signals from the respective transmitters, the receiver being adapted to generate a warning signal in accordance with the received air pressure signals,
wherein the air pressure signal transmitted from each of the transmitters includes an ID of the corresponding transmitter as an ID signal,
the receiver is capable of switching a mode thereof to an ID registration mode in which the IDs of the transmitters are registered, and
during the ID registration mode, the transmitters are forced to transmit the air pressure signals, and if the number of the air pressure signals received from the transmitters is equal to a predetermined value, the receiver registers the IDs of the transmitters based on the ID signals included in the received air pressure signals.

2. The tire inflation pressure monitoring device according to claim 1, wherein the receiver terminates the ID registration when the receiver is input with information from the transmitters which is different from the air pressure signals and which indicates that the air pressure signals have been forcedly transmitted from all of the transmitters whose IDs are to be registered, or when a predetermined time has elapsed from start of the ID registration mode.

3. The tire inflation pressure monitoring device according to any one of claim 1, wherein the air pressure signal includes a function code permitting a discrimination to be made between an ID registration air pressure signal corresponding to the ID registration mode and an ordinary air pressure signal other than the ID registration air pressure signal, and
the receiver registers the ID of the transmitter only when the function code of the corresponding air pressure signal is indicative of the ID registration air pressure signal.

4. The tire inflation pressure monitoring device according to any one of claim 2, wherein the air pressure signal includes a function code permitting a discrimination to be made between an ID registration air pressure signal corresponding to the ID registration mode and an ordinary air pressure signal other than the ID registration air pressure signal, and
the receiver registers the ID of the transmitter only when the function code of the corresponding air pressure signal is indicative of the ID registration air pressure signal.

5. A tire inflation pressure monitoring device, comprising:
transmitters attached to respective tires of a vehicle, for transmitting air pressure signals indicative of air pressures in the tires detected by respective air pressure sensors; and
a receiver for receiving the air pressure signals from the respective transmitters, the receiver being adapted to generate a warning signal if the air pressure in any of the tires, indicated by the received air pressure signals, is equal to or lower than a predetermined value,
wherein, the air pressure signal transmitted from each of the transmitters includes an ID of the corresponding transmitter as an ID signal,
the receiver is capable of switching a mode thereof to an ID registration mode in which the IDs of the transmitters are registered,
in the ID registration mode, actual air pressures in the tires are reduced to a value equal to or lower than the predetermined value, and
if, in the ID registration mode, the air pressures in the tires, indicated by the respective air pressure signals, are equal to or lower than the predetermined value, the receiver registers the IDs of the transmitters based on the respective ID signals included in the air pressure signals.

6. The tire inflation pressure monitoring device according to claim 5, wherein, if the air pressure in any of the tires, indicated by the corresponding received air pressure signal, is equal to or lower than the predetermined value and also the ID of the corresponding transmitter, indicated by the ID signal included in the air pressure signal, coincides with one registered in the receiver, the receiver judges that the air pressure in the tire to which the transmitter with this ID is attached has decreased and generates a warning signal, regardless of whether the mode is the ID registration mode or not, and when the air pressure in the tire becomes higher than the predetermined value thereafter, the warning signal is canceled.

7. The tire inflation pressure monitoring device according to any one of claim 5, wherein the air pressure signal includes a function code permitting a discrimination to be made between an ID registration air pressure signal corresponding to the ID registration mode and an ordinary air pressure signal other than the ID registration air pressure signal, and the receiver registers the ID of the transmitter only when the function code of the corresponding air pressure signal is indicative of the ID registration air pressure signal.

8. The tire inflation pressure monitoring device according to any one of claim 6, wherein the air pressure signal includes a function code permitting a discrimination to be made between an ID registration air pressure signal corresponding to the ID registration mode and an ordinary air pressure signal other than the ID registration air pressure signal, and the receiver registers the ID of the transmitter only when the function code of the corresponding air pressure signal is indicative of the ID registration air pressure signal.

* * * * *